United States Patent [19]

Murakami

[11] Patent Number: 4,847,640

[45] Date of Patent: Jul. 11, 1989

[54] DUAL-MODE RECORDER SYSTEM

[75] Inventor: Osamu Murakami, Yokohama, Japan

[73] Assignee: Canon Kabushiki Kaisha, Tokyo, Japan

[21] Appl. No.: 120,752

[22] Filed: Nov. 10, 1987

Related U.S. Application Data

[63] Continuation of Ser. No. 840,853, Mar. 18, 1986, abandoned.

[30] Foreign Application Priority Data

Mar. 22, 1985 [JP] Japan .................................. 60-55662

[51] Int. Cl.[4] ......................... G01D 15/00; B41J 13/00

[52] U.S. Cl. .................................... 346/145; 400/605; 400/625

[58] Field of Search ................ 346/145; 400/208, 605, 400/625, 639.1; 235/375, 382, 382.5; 344/464, 466; 101/93.12

[56] References Cited

U.S. PATENT DOCUMENTS 4,074,275 2/1978 Stires, III .............................. 346/19
4,452,543 6/1984 Adkisson et al. ................... 400/605
4,519,048 5/1985 Abellana et al. ..................... 364/900
4,531,852 7/1985 Mädge et al. ......................... 400/692
4,569,608 2/1986 Watanabe ............................. 400/208
4,629,871 12/1986 Scribner et al. .................... 235/375

*Primary Examiner*—Elliot A. Goldberg
*Assistant Examiner*—Gerald E. Preston
*Attorney, Agent, or Firm*—Fitzpatrick, Cella, Harper & Scinto

[57] ABSTRACT

An electronic apparatus comprising a case housing a printer unit. The case includes an upper case portion and a lower case portion. The upper case portion has a first recording medium insertion port, and the lower case portion has a second recording medium insertion port. The angle between the direction in which a recording medium is inserted into the first recording medium insertion port and the direction in which the inserted recording medium is carried in the apparatus is larger than the angle between the direction in which a recording medium is inserted into the second medium insertion port and the direction in which the last-mentioned inserted medium is carried in the apparatus.

9 Claims, 4 Drawing Sheets

DUAL-MODE RECORDER SYSTEM

This application is a continuation of application Ser. No. 840,853 filed Mar. 18, 1986, now abandoned.

BACKGROUND OF THE INVENTION

1. Field of the Invention

The present invention relates to electronic apparatuses, particularly, an electronic apparatus with output devices which have batteries as power sources.

2. Related Background Art

Recently, several recording devices having low power consumption are being developed, inclusive of printing devices such as printers. For example, it has become practical that dry cells are used to drive even a large-sized printer such as a thermal-transfer type or a daisy-wheel type printer used in an electronic apparatus such as an electronic typewriter or a word processor.

FIG. 4 shows a conceivable form of an electronic device with a printer of this type. Reference numeral 1 denotes a dry cell; reference numeral 2, a printer; and reference numeral 3, the input section to printer 2.

An electronic apparatus of this type can use a variety of printing sheets. For example, it can print on a thick firm sheet such as a postal card or on a thin sheet. Generally, as shown in FIG. 4, the apparatus is provided with an insertion port 4 and an ejection port 5 located on the same upper surface thereof, as in various conventional printers.

In an electronic apparatus of the type which is provided with insertion port 4 and ejection port 5 on the same upper surface thereof, as shown in FIG. 4, however, a paper sheet is fed out in the route shown by the arrow in such a manner that it is rolled in by a paper feed roller. There is no problem with a thin sheet, but a thicker sheet, if inserted, is difficult to bend, and is troublesome to handle. The latter also raises a problem concerning printing quality.

SUMMARY OF THE INVENTION

The present invention solves the above problems. An object of the present invention is to provide an electronic apparatus with a recording device which has a first insertion port provided on the recording device and into which a thin sheet is inserted, a second insertion port into which a thick sheet is inserted, and an insertion passageway means in cooperation with the second insert portion for guiding the sheet from the bottom side of the lower case portion where the drive source is enclosed to a sheet feed roller in order that both thick and thin sheets can be easily inserted and that the thick sheet need not be severely bent.

Another object of the present invention is to provide an electronic apparatus which is capable of using a desired insertion passageway means selectively in accordance with the type of recording medium thereby producing a high-quality output.

DETAILED DESCRIPTION OF THE INVENTION

An embodiment of the present invention will now be described in more detail and more specifically.

Figure 1:
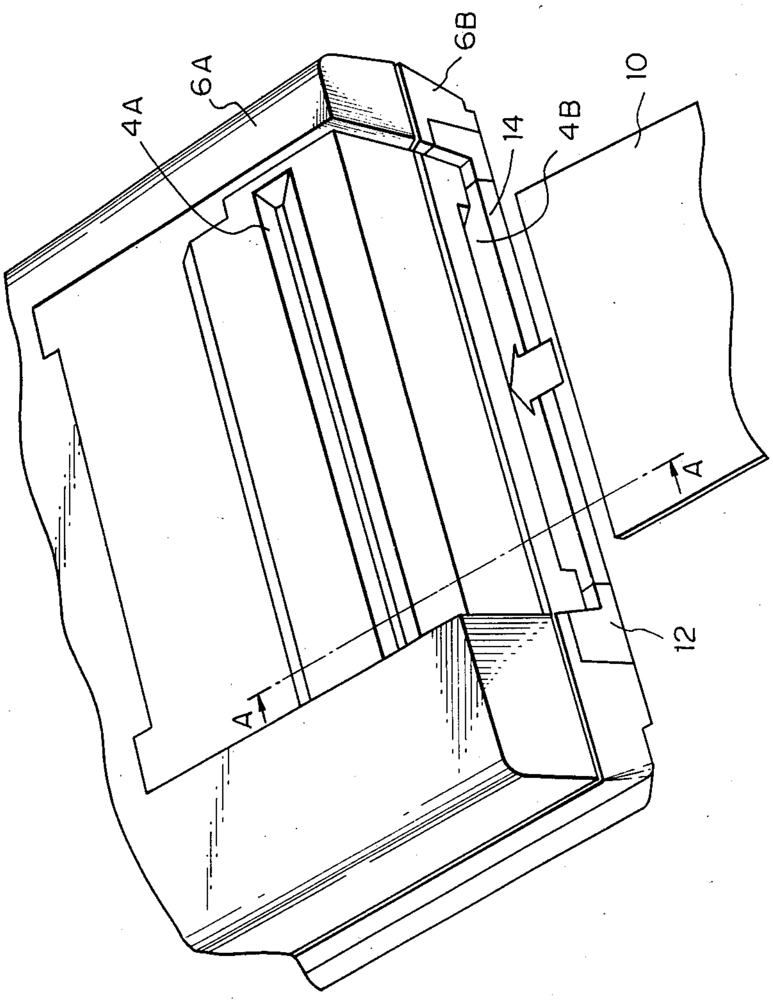
FIG. 1 is a perspective view of one example of the main portion of an electronic apparatus according to the present invention.
Figure 2:
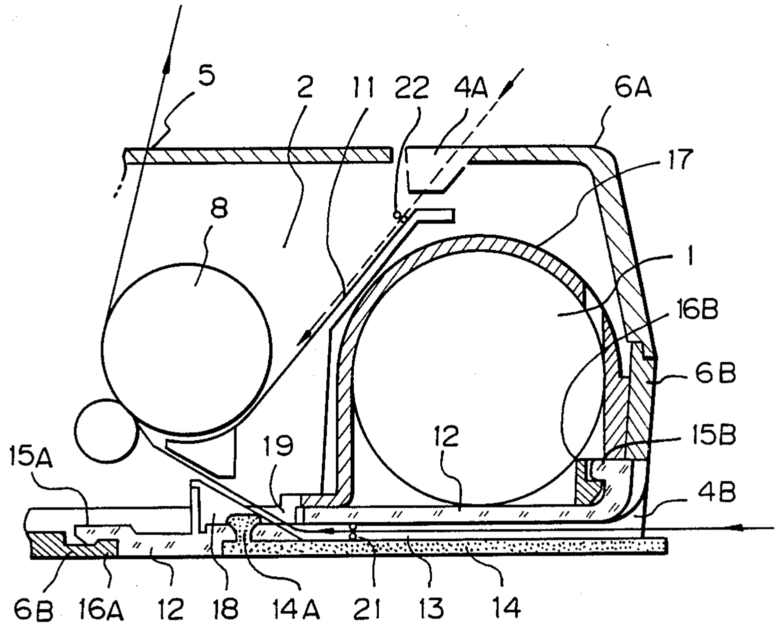
FIG. 2 is a cross-sectional view taken along the line A—A of FIG. 1.
Figure 4:
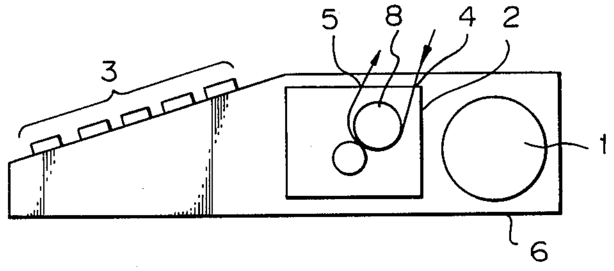
FIG. 4 is a model view showning the structure of the main portion of an electronic apparatus with a printer, and two conceivable forms of a sheet carrying route.

FIG. 1 and 2 show an embodiment of the present invention. This embodiment is an electronic apparatus with a printer, to which the present invention is applied, only the rearward half of the apparatus being shown. Reference signs 6A and 6B denote an upper case portion and a lower case portion, respectively. Reference signs 4A and 4B denote a first sheet insertion port provided at the upper case portion and a second sheet insertion port provided along the lower surface of the lower case portion, respectively.

In the particular embodiment, a sheet 10, if thick, is inserted into second insertion port 4B, and, if thin, inserted into first insertion port 4A. As shown in FIG. 2, a first guidance passageway 11 for sheet 10 is provided from first insertion port 4A to a sheet feed roller 8 of a printer 2. A battery cover proper (hereinafter referred to as battery cover) 12 is fixed to the lower surface of lower case portion 6B. An additional cover 14 is fixed to the battery cover to form a second guide passageway 13 extending from second insertion port 4B.

Battery cover 12 is engaged at their pawls 15A and 15B with the corresponding engagement portions 16A and 16B of the lower case portion 6B. When batteries 1 are to be replaced, it is required that battery cover 12 as well as additional cover 14 are removed from lower case portion 6B, the batteries 1 in battery chamber 17 are replaced with new ones, and covers 12 and 14 are finally returned to their original positions.

The structure of covers 12 and 14 will now be described with respect to FIG. 3A and 3B.

Figure 3A:
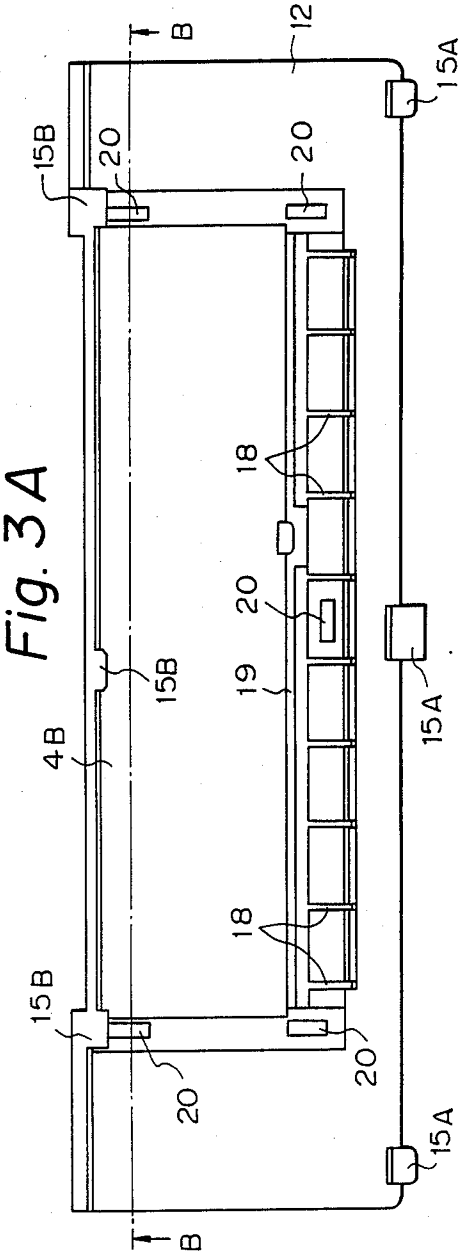
FIG. 3A is a top plan view of one example of the structure of a battery cover of the electronic apparatus according to the present invention.
Figure 3B:
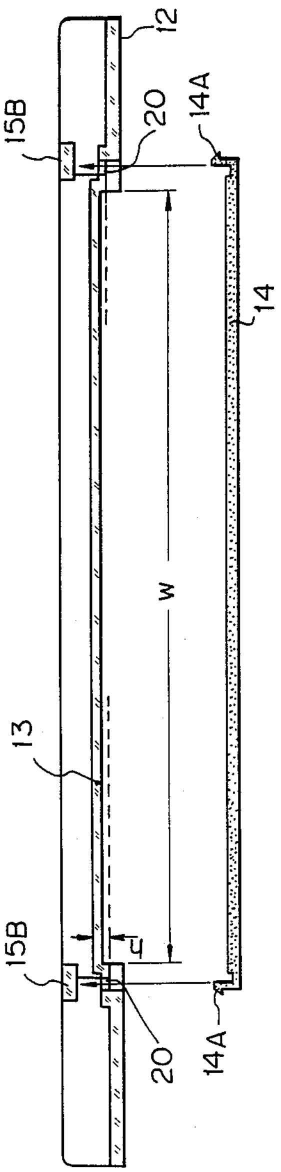
FIG. 3B is a cross-sectional view taken along the line B—B of FIG. 3A, showing the relation between the battery cover and an additional cover fixed to the battery cover.

FIG. 3A is a view of battery cover 12 seen from the inside of the case. Second guide passageway 13 is formed on the reverse side of the battery cover. In more detail, as shown in FIG. 3B, the second guide passageway is provided having a gap distance h between covers 12 and 14, through which gap a thick paper sheet can be inserted, by fixing additional cover 14 to the reverse or lower surface of the battery cover.

Also, in FIG. 3A, reference numeral 18 denotes guide ribs which raise the sheet toward paper feed roller 8. A thick sheet, inserted from second insertion port 4B, is guided from the reverse side of battery cover 12 through a gap 19 to a guide rib 18 and hence to paper feed roller 8, as shown in FIG. 2. The number of guide ribs and the overall width of each guide rib may be determined appropriately in accordance with the width of second guide passageway 13, etc.

Reference numeral 20 denotes engagement holes to removably engage additional cover 14 therewith which is fixed to battery cover 12 by engagement of pawls 14A with holes 20 thereby to form insertion port 4B and second guide passageway 13.

While in the particular embodiment the covers 12 and 14 are engaged as mentioned above, both the covers may be formed as a unit with a slide-type mold, or by boss welding, ultrasonic welding or bonding. A structure such as that of the particular embodiment is preferable from the standpoint of operation and cost.

It goes without saying that instead of the assembly of covers 12 and 14, a similar structure may be obtained by a combination of two other different parts.

In the particular apparatus, a thin sheet can be inserted through first insertion port 4A, supplied through first guide passageway 11 to roller 8 of printer 2, printed and discharged from ejection port 5. A thick sheet can be inserted through second insertion 4B, passed through second guide passageway 13 and the next guide ribs 18 to roller 8 and hence to ejection port 5 in a gentle manner to be discharged.

While the above description has been made on an electronic apparatus with a printer, of course, it is not only applicable to the particular apparatus, but also to widely general electronic apparatus with recording device.

In addition, while in the particular embodiment the apparatus with two insertion ports (first and second insertion ports) has been described, it goes without saying that a similar effect to that of the particular embodiment can be obtained from an apparatus with only an insertion port such as the second insertion port involved in the present invention.

As described above, according to the present invention, an electronic apparatus with a recording device driven by a drive source enclosed in the case has an insertion port, into which a paper sheet is insertable parallel to the lower surface of the case, in conjunction with a cover for the drive source fixed to the lower side of the case, and a guide passageway which guides an inserted sheet to the recording section. Thus, even a thick sheet is not severely bent at the recording section, as does a conventional apparatus. The apparatus has a simple structure into which a sheet, whether thick or thin, can easily be inserted and from which the sheet can normally be taken out.

Figure 5:
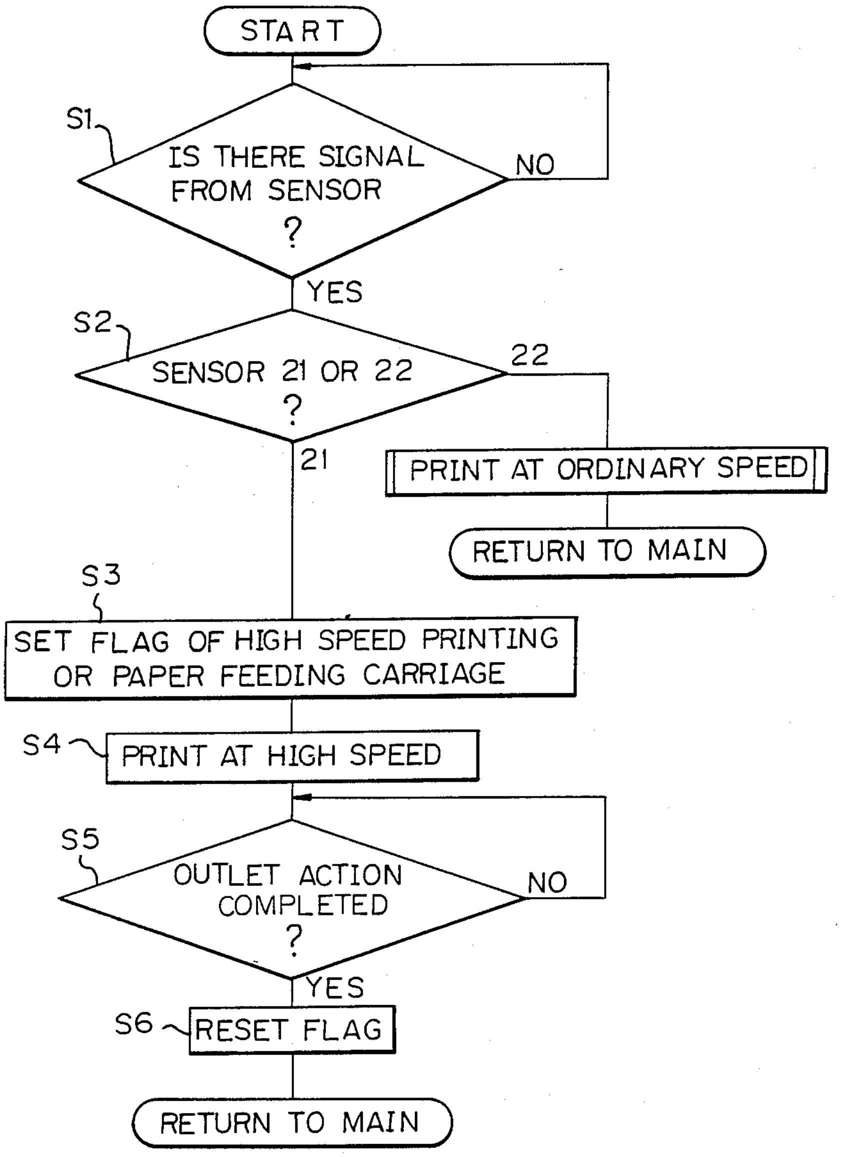
FIG. 5 is a flowchart showing control for drive of the carrier system.

The carrier system may be controlled in accordance with the type of recording medium, as shown in the flowchart of FIG. 5, in such a manner that insertion of the recording medium is checked by a sensor 21 or 22 at the carrier, insertion ports, or discharge port; when insertion of the recording medium, for example from the second insertion port, is detected, it is determined that the medium is a thick sheet (s1 and s2 in FIG. 5); and thus either the drive torque from the carrier system drive section is increased or the printing speed and paper feed speed are increased (s3, s4 in FIG. 5). Discharge of a sheet may be controlled (s5 in FIG. 5). In the present invention, it goes without saying that the apparatus includes a control section such as a CPU which controls sheet feeding, the sheet sensors, carriage, etc., although the details of the control section are omitted.

What is claimed is:

1. A case for an electronic apparatus which accommodates a recording device for recording on paper sheets, the recording device being driven by a drive source in the case, the case including:

a first insertion port for relatively thin paper sheets;

a second insertion port for relatively thick paper sheets;

first guide means for guiding the paper sheets from said first insertion port of the recording device;

second guide means for guiding the paper sheets from said second insertion port of the recording device;

discharge port for discharging said thin and thick paper sheets which have passed the recording device;

a drive source accommodating cover for holding the drive source within the electronic apparatus, wherein said second guide means is formed in said drive source accommodating cover; and a plate member which is spaced apart from said drive source accommodating cover by a predetermined distance and which is removably engage at said drive source accommodating cover, said second insertion port being formed by said plate member and said drive source accommodating cover;

wherein an angle of bend of a paper passage extended from said second insertion port to said discharge port through said recording device is larger than an angle of bend of a paper passage extended from said first insertion port to said discharge port through said recording device.

2. A case according to claim 1, further including sensing means provided at said insertion port for detecting insertion of a sheet into said second insertion port and outputting information for identifying the type of material of the sheet.

3. A case according to claim 1, further including control means for controlling the recording device in accordance with the information output by said sensing means.

4. A case according to claim 1, wherein:

said drive source accomodating cover is substantially planar; and said plate member is substantially planar and disposed in facing relation to said drive source accomodating cover to form a guide passageway therebetween for the paper sheet.

5. A case according to claim 4, wherein:

said drive source accomodating cover includes means for removably securing said cover to the case to permit access to a battery chamber in the case; and said plate member is secured to said drive source accomodating cover.

6. A case according to claim 4, wherein:

said second insertion port is disposed at one end of said guide passageway; and said second guide means is disposed at the other end of said guide passageway at a location relative to the recording device so that the paper sheets are bent through obtuse angles only as they pass through the case past the recording device.

7. A case according to claim 6, further comprising a second guide passageway for guiding paper sheets to the recording device, said second guide passageway being spaced from said first-mentioned guide passageway and disposed at a location relative to the recording device so that paper sheets guided by said second guide passageway are bent through an acute angle as they pass through the case past the recording device.

8. A case according to claim 7, further including sensing means provided in said second guide passageway for detecting insertion of a sheet into said second guide passageway and outputting information for identifying the type of material of the sheet.

9. A case according to claim 8, further including control means for controlling the recording device in accordance with the information output by said sensing means.

* * * * *